(12) United States Patent
Bissett et al.

(10) Patent No.: US 8,474,575 B2
(45) Date of Patent: Jul. 2, 2013

(54) MOUNTING FOR A SAFETY SYSTEM

(75) Inventors: Timothy Bissett, Devizes (GB);
Andrew Beaman, Sutton Coldfield (GB)

(73) Assignee: Latchways PLC, Wiltshire (GB)

( * ) Notice: Subject to any disclaimer, the term of this patent is extended or adjusted under 35 U.S.C. 154(b) by 123 days.

(21) Appl. No.: 12/849,892

(22) Filed: Aug. 4, 2010

(65) Prior Publication Data

US 2012/0031702 A1    Feb. 9, 2012

(51) Int. Cl.
*E04G 3/00*    (2006.01)

(52) U.S. Cl.
USPC ........................................................ 182/113

(58) Field of Classification Search
USPC .......... 182/113; 403/79, 84, 87, 4; 256/65.14; 248/188.4
See application file for complete search history.

(56) References Cited

U.S. PATENT DOCUMENTS

| | | | | |
|---|---|---|---|---|
| 650,882 A * | 6/1900 | Walker | ............................ | 403/84 |
| 4,298,248 A * | 11/1981 | Lapp | ............................ | 248/481 |
| 4,836,485 A * | 6/1989 | Cooper | ....................... | 248/278.1 |
| 6,015,139 A * | 1/2000 | Weber | ......................... | 256/65.14 |
| 6,607,054 B1 | 8/2003 | Lindfield | | |
| 6,863,253 B2 * | 3/2005 | Valentz et al. | ................. | 248/519 |
| 7,063,186 B1 * | 6/2006 | Granke | .......................... | 182/113 |
| 2004/0258460 A1 * | 12/2004 | Taylor | ............................ | 403/79 |
| 2006/0278472 A1 * | 12/2006 | Kenton et al. | .................. | 182/113 |

* cited by examiner

*Primary Examiner* — Alvin Chin Shue
(74) *Attorney, Agent, or Firm* — Gordon & Jacobson, PC

(57) ABSTRACT

A mounting for a support post of a safety system has a cylindrical stem to be removably received in a cylindrical socket of an anchor device to be secured to a structure, and a connector enabling connection to the support post of the safety system. The connector is articulated with respect to the cylindrical stem to be adjustable over a range of attitude orientations with respect to the cylindrical stem and a securing device secures the connector at a specific attitude orientation with respect to the cylindrical stem. The mounting may be used in a safety guardrail system for working at height, with a vacuum anchor and a support post to which the guardrail is mounted. The support post is mounted to the vacuum anchor by the articulated mounting to enable the orientation angle of the support post to be adjusted with respect to the anchor device.

10 Claims, 4 Drawing Sheets

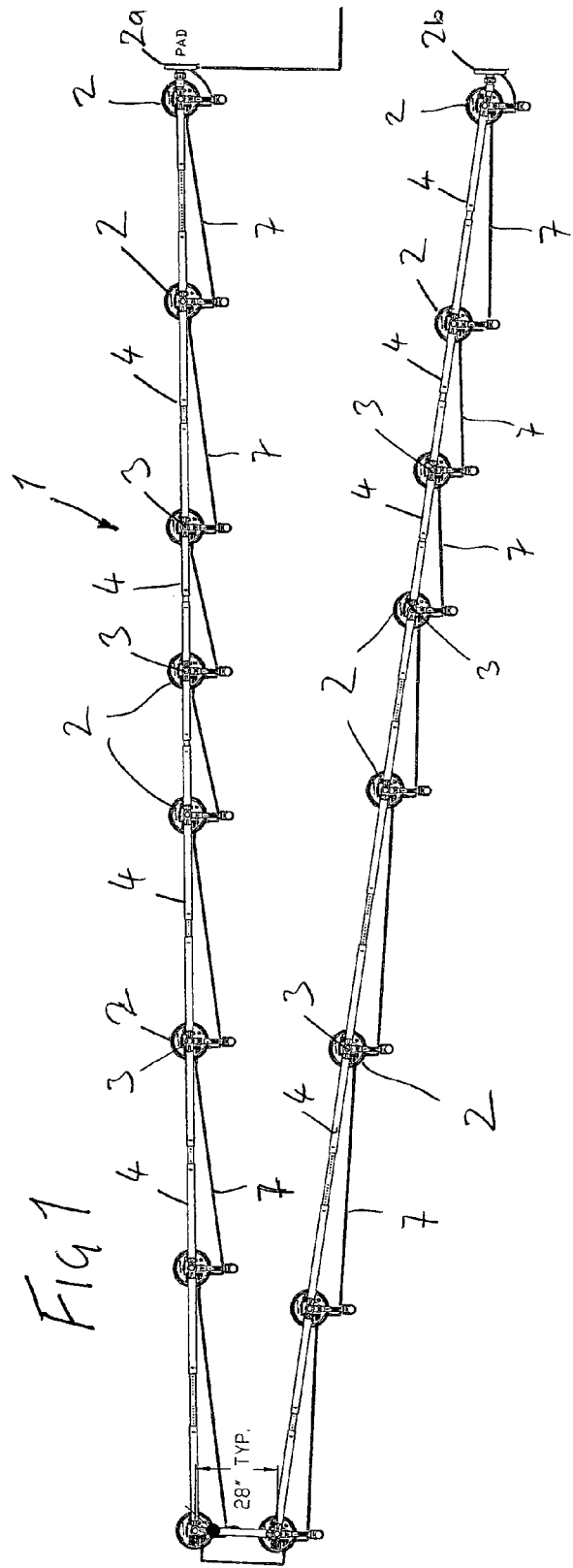

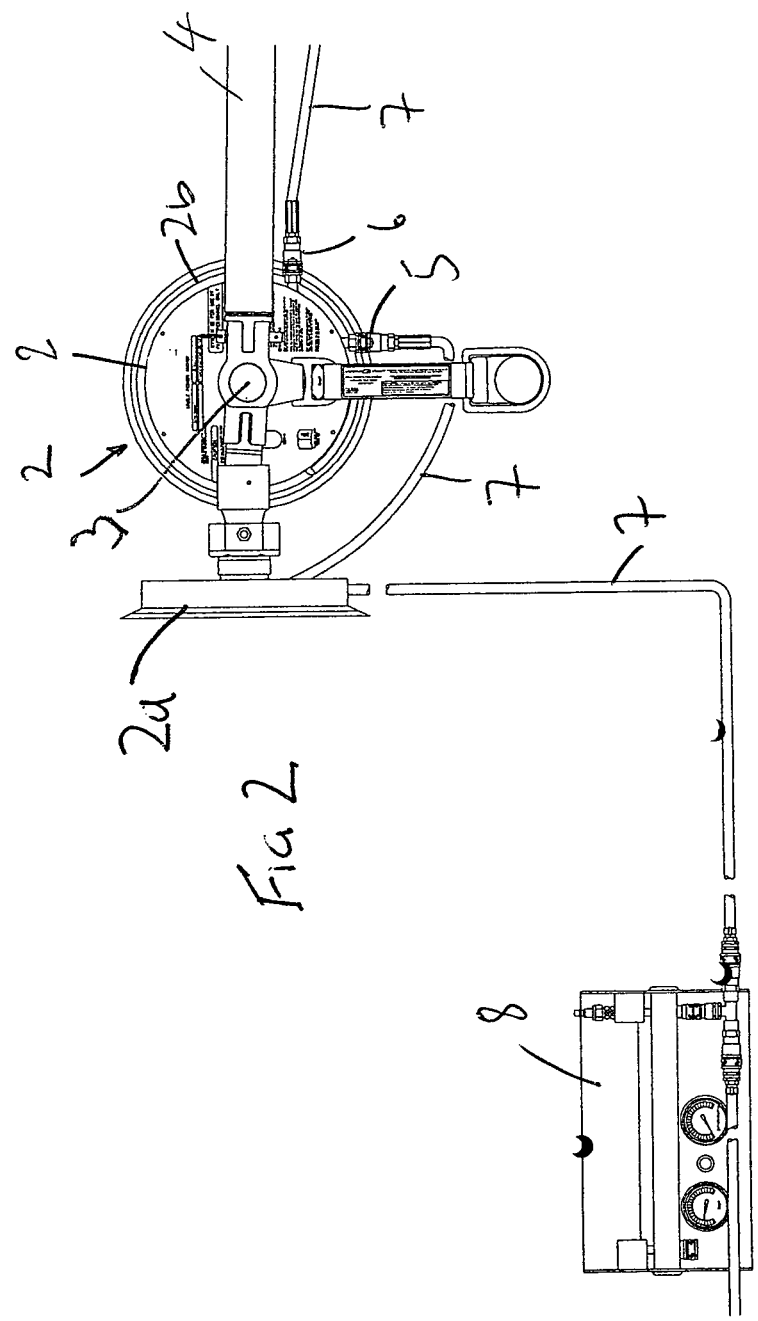

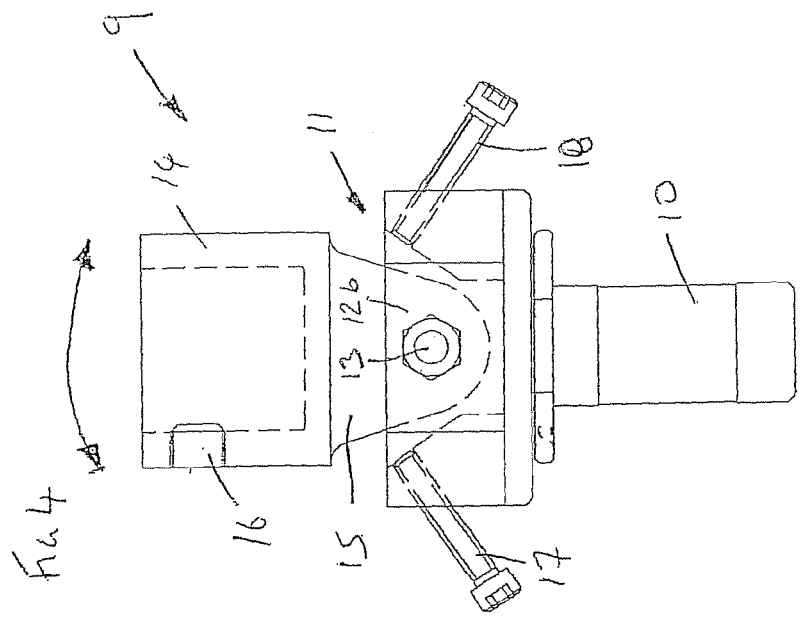
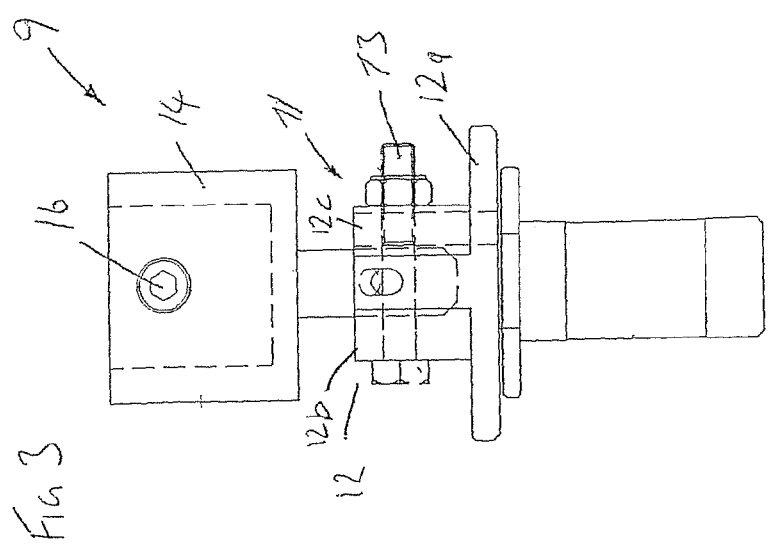

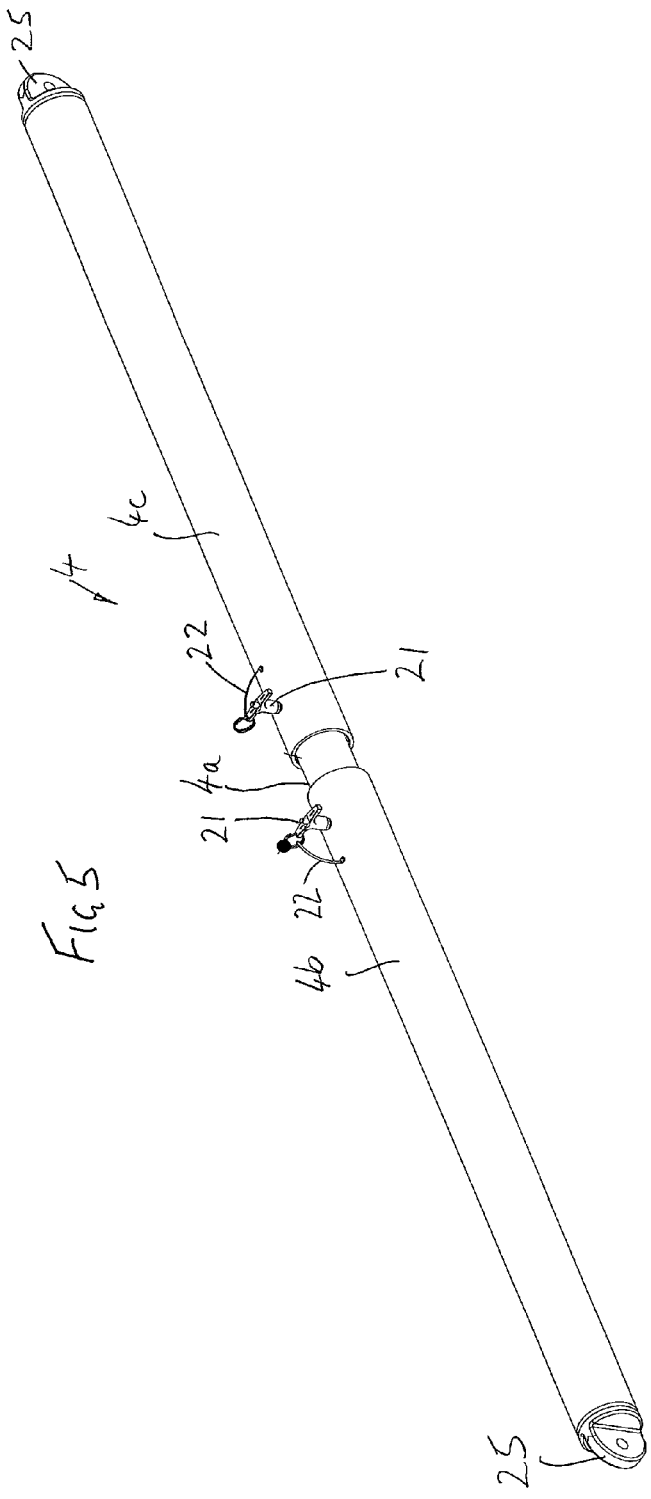
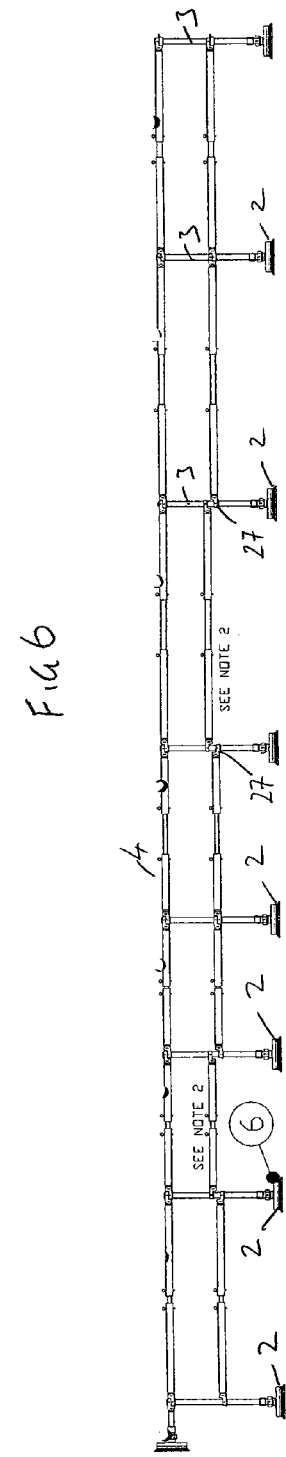

MOUNTING FOR A SAFETY SYSTEM

BACKGROUND OF THE INVENTION

1. Field of the Invention

This invention relates to a mounting for a safety system, and more specifically to a mounting for a safety system for persons working at height, utilizing an anchor arrangement, which in use is to be secured to an uneven, non-uniform profiled surface of a structure.

2. State of the Art

The invention has particular applicability to situations in which safety systems need to be installed for working at height on structures such as aircraft wings in which the surface upon which the operatives are working is uneven, curve profiled, undulating, or otherwise non-uniform. The invention also has application in other situations and particularly provides a mounting that has a high degree of flexibility in terms of its range of use.

A prior art safety system for use on aircraft wings is disclosed in, for example, U.S. Pat. No. 6,607,054. In the system disclosed a series of vacuum anchor devices are secured to a structure such as an aircraft wing and arranged to support a guardrail or barrier arrangement comprising upright posts which have respective stems inserted into a receiving socket in the vacuum anchor. Vacuum anchor devices are well known in the art for anchoring safety lines, barriers or other systems to thin skinned structures such as aircraft wings. In the arrangement shown in U.S. Pat. No. 6,607,054, cross-members span between the upright posts to provide the guardrail or barrier restraint.

An improved arrangement has now been devised.

SUMMARY OF THE INVENTION

In accord with the invention, there is provided a mounting for a support post of a safety system, the mounting including:

a cylindrical stem to be removably received in a cylindrical socket of an anchor device to be secured to a structure;

a connector enabling connection to the support post of the safety system, the connector being articulated with respect to the cylindrical stem to be adjustable over a range of attitude orientations with respect to the cylindrical stem; and a securing arrangement for securing the connector at a specific attitude orientation with respect to the cylindrical stem.

It is preferred that the connector is mounted to be movable pivotally or rotationally with respect to the stem.

Beneficially, the connector is articulated with respect to the stem to be movable about an articulation axis, which articulation axis is transverse to the longitudinal axis of the stem.

In one embodiment, it is preferred that the connector is mounted to a pivot formation (such as a bolt for example), which extends transverse to the longitudinal axis of the stem. In an alternative embodiment a gimbaled connection or ball and socket joint could be utilized to give the required articulation range of movement.

In one embodiment, it is preferred that the connector includes a socket for receiving an end of the support post.

The connector preferably includes a releasable faster for releasable fastening of the support post with the connector.

The securing arrangement comprises may comprise one or more mechanical fixings arranged to be movable to abut against the connector.

In certain embodiments, it is preferred that the mechanical fixings are provided on opposed sides of an articulation joint such as a pivot or hinge axis about which the connector pivots, hinges or otherwise rotatably moves.

The mechanical fixings may comprise elongate projections and beneficially may be adjustable in terms of their projection distance toward or away from the connector, in order to enable the connector to be secured at different specific attitude orientations.

It may be preferred that the mechanical fixings are arranged to abut against the connector above the level of an articulation joint such as a pivot or hinge axis about which the connector pivots, hinges or otherwise rotatably moves.

In certain embodiments, the mechanical fixings may comprise elongate members, movable in their longitudinal direction and are arranged to extend inclined upwardly and have an end arranged to abut against the connector.

According to a further aspect, the invention provides a safety system including:

i) an anchor device for securing to the surface of a structure; and ii) a mounting for mounting a support post to be supported on the anchor device, the mounting including:

a cylindrical stem to be removably received in a cylindrical socket of the anchor device, a connector enabling connection to the support post of the safety system, the connector being articulated with respect to the cylindrical stem to be adjustable over a range of attitude orientations with respect to the cylindrical stem; and a securing arrangement for securing the connector at a specific attitude orientation with respect to the cylindrical stem.

The mounting is articulated to enable the orientation angle of the support post to be adjusted with respect to the anchor device.

In certain embodiments, it is preferred that the anchor device comprises a vacuum anchor device.

The cylindrical stem of the mounting is preferably received in the cylindrical socket of the anchor so as to be rotatable about the longitudinal axis of the stem.

The safety system of the invention may further include a plurality of barrier guardrails arranged to extend between adjacent upright posts in the system, the barrier guardrails being adjustable in length and arranged to be secured to the upright posts in alternative height regimes.

Additional objects and advantages of the invention will become apparent to those skilled in the art upon reference to the detailed description taken in conjunction with the provided figures.

BRIEF DESCRIPTION OF THE DRAWINGS

FIG. 1 is a schematic plan view of a safety system according to the invention forming a barrier for an aircraft wing.

FIG. 2 is a plan view of a vacuum anchor comprising the safety system of FIG. 1.

FIG. 3 is a front-end view of a mounting device providing the connection between the anchor and the upright post of the system of FIGS. 1 and 2.

FIG. 4 is a side view of the mounting device of FIG. 3.

FIG. 5 is a perspective view of a cross-member arrangement comprising the safety system of FIG. 1.

FIG. 6 is a side view of a part of the safety system of FIG. 1.

DETAILED DESCRIPTION OF THE PREFERRED EMBODIMENTS

Referring to the drawings of FIGS. 1-6, there is shown a safety barrier guardrail system 1 comprising a series of spaced vacuum anchor devices 2, each arranged to support a respective upright post 3. Adjustable length guardrail crossmembers 4 interconnect the upright posts 3. The safety barrier guardrail system 1 is particularly suited for use on uneven or undulating surfaces for personnel working at height, such as for example working on the wing of an aircraft for maintenance purposes. For this reason the s as shown in FIG. 1 is shaped to define an aircraft wing shaped pen boundary. End vacuum anchors 2a 2b anchor on to the fuselage of the aircraft.

The vacuum anchor devices secured to the aircraft wing and fuselage are connected via vacuum lines 7. The vacuum anchor devices are generally in accordance with those known in the art and accordingly will not be described in detail herein. As shown in FIG. 2, the vacuum anchor devices 2 have vacuum line connectors 5, 6 for connection to a vacuum line 7. The vacuum anchor device 2 has a main body which supports a rubber flexible sucker member 2b. Vacuum (gaseous pressure less than atmospheric pressure) is supplied via the vacuum line 7 from a remote vacuum generation unit 8 fluidly coupled thereto. Appropriate check valves and control vales are typically mounted to the anchor body 2a. The pair of vacuum line connectors 5,6 enable the series of spaced vacuum anchors to be connected in series in the vacuum circuit such that vacuum can be applied to all the vacuum anchor devices from a single vacuum generation unit 8.

Each vacuum anchor device has a central cylindrical socket for receiving one of the upright posts. This is known in the art and shown in FIG. 4 of U.S. Pat. No. 6,607,054 where the socket is described as 'hole 16'.

In a departure from the prior art, and in accordance with the present invention, the post 3 is not mounted to be directly received within the cylindrical socket of the vacuum anchor device 2, but rather an intermediate mounting device 9 is used to secure the post 3 with respect to the vacuum anchor device.

Referring now specifically to FIGS. 3 and 4, the mounting device 9 for the posts of the safety barrier guardrail system 1 comprises a cylindrical stem portion 10, extending downwardly from an angularly adjustable articulated mounting joint 11. The angularly adjustable articulated mounting joint 11 comprises a mounting body 12 defining a recess spanned by a bolt 13 extending between spaced uprights 12b, 12c. The bolt 13 provides a rotatable, pivot or hinge mounting for the post and in the embodiment shown mounts a receiving socket 14 which receives the lower end of the upright support post 3. A fixing flange 15 extends from the underside of the socket 12 and is provided with a mounting aperture through which the bolt 13 may pass.

It will be appreciated that in some embodiments the socket 14 may be dispensed with and the support post 3 may be directly mounted to the angularly adjustable mounting at the hinge bolt 13, by means of providing a special adaptation to the lower end of the support post 3, in order to provide a mounting flange and aperture similar to that provided for the socket 14. It is however generally preferred that the socket mounting 14 is used in order to enable standard existing mounting posts to be accommodated. The socket mounting is provided with a set screw 16 threaded into a threaded through bore in the side of the socket 14 in order to enable the support post 3 to be securely held when received in the socket 14.

In certain situations it is desirable to angle the upright support post with respect to the surface to which the vacuum anchor device is secured, such that the support post is at an angle of inclination with respect to the surface, but still orientates the support post in a 'true' upright orientation. This can occur as a result of adjacent vacuum anchor devices being mounted to differently inclined surfaces, there being a requirement for optimum performance of the system that the adjacent upright posts are orientated in a common or parallel upright orientation.

The angularly adjustable articulated mounting joint 11 for the support post 2 enables the support post 2 to be angularly adjusted to provide varying degrees of angular inclination with respect to the surface to which the vacuum anchor device is secured. This is achieved by the axis of the hinge or pivot bolt being transverse to the longitudinal axis of the upright support post. Additionally positional flexibility is achieved by means of the stem 10 being rotatable about its longitudinal axis whilst received in the socket of the vacuum anchor device 2.

As an alternative to a pivot or hinge structure mounting joint, alternative articulated joints may be employed to give the desired range of movement, such as for example a gimbaled mount or joint or a ball and socket joint.

The angularly adjustable articulated mounting is further provided with a securing arrangement for securing the mounting in the selected configuration in which the support post 3 is orientated set with its longitudinal axis directed in the desired direction. In the embodiment shown, this is achieved by means of opposed directed threaded securing members 17, 18 directed through the mounting body 12 and secured in threaded bores. The ends of the threaded securing members 17, 18 can be advanced into the recess in the mounting body 12 to contact the fixing flange 15. When the ends of the threaded securing members 17, 18 are both abutting tight against the opposed sides of the fixing flange 15, the mounting is secured in the selected configuration in which the support post is orientated set with its longitudinal axis extending in the desired direction.

The heads of the threaded securing members are readily accessible in order to be actuated to effect tightening against the fixing flange. The threaded securing members are typically bolts. Other mechanical fixings can be used to secure the mounting at the correct attitude, with the support post in the desired orientation. The bolts 17, 18 are angled inclined upwardly such that the ends of the bolts contact the opposed sides of the mounting flange 15 at a level above the level of the hinge bolt axis 13. This enhances the security with which the socket 14 and post 3 is held in position.

Referring to FIGS. 5 and 6, the cross-members 4 of the safety barrier guardrail system 1 are adjustable in length and comprise an inner tube 4a mounted telescopically within respective opposed end tubes 4b and 4c. Respective securing pins 21 are tethered to the tubes 4b and 4c by tethers 22 and pas through receiving apertures in the respective tubes 4b and 4c to engage with selected ones of a series of spaced apertures provided in the inner tube 4a, dependent upon the length selected for the respective overall cross member tube 4. The ends of the cross-member tube 4 are provided with apertured flanges 25 enabling the tubes to be bolted to respective collars 27 which are secured about the support posts 3. The collars 27 are positionally movable along the length of the support posts 3 and securable at desired selected positions by means of tightenable collar bolts (not shown) as known in the general art.

The safety barrier guardrail system 1 of the invention provides a reliable system having a set number of component parts that can be quickly and conveniently set up to provide a safe barrier or guardrail system. Because the mounting is articulated to enable the orientation angle of the support post to be adjusted with respect to the anchor device, the support posts can be orientated 'true' upright even when adjacent support pots are mounted on uneven or differently inclined mounting surfaces.

While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. A safety system for use with a structure having a surface that has variations in inclination over the surface, the safety system comprising:
   i) a plurality of vacuum anchor devices for securing to the surface of the structure, each vacuum anchor device having a cylindrical socket;
   ii) a plurality of barrier guardrails;
   iii) a plurality of support posts corresponding to the plurality of vacuum anchor devices, each support post with at least one coupler corresponding to the at least one barrier guardrail, the coupler configured to couple to the corresponding barrier guardrail; and
   iv) a plurality of mountings corresponding to the plurality of vacuum anchor devices and the plurality of support posts, each mounting for mounting a respective support post on a respective vacuum anchor device, the mounting including
      a cylindrical stem configured to be removably received in the cylindrical socket of the respective vacuum anchor device,
      a connector operably connected to the respective support post, the connector being articulated with respect to the cylindrical stem to pivot about a pivot axis over a range encompassing a plurality of different attitude orientations with respect to the cylindrical stem,
      wherein the connector includes an interface that mates to an end of the respective support post, and a securing arrangement that is configured to limit pivoting movement of the connector relative to the cylindrical stem and fixably secure the connector to the cylindrical stem at a user-specified attitude orientation of any one of the plurality of different attitude orientations of the connector with respect to the cylindrical stem, wherein the securing arrangement comprises at least one mechanical fixing having a configuration wherein the at least one mechanical fixing abuts against the connector at a level above the pivot axis about which the connector pivots relative to the cylindrical stem;
   wherein the plurality of barrier guardrails are arranged to extend between adjacent support posts, and the securing arrangements of the plurality of mountings are configured independently with respect to one another by user operation in order to compensate for the variations in inclination of the surface of the structure.

2. A safety system according to claim 1, wherein:
the plurality of barrier guardrails are adjustable in length and arranged to be secured to the support posts in alternative height regimes.

3. A safety system according to claim 1, wherein:
the pivot axis about which the connector pivots relative to the cylindrical stem is transverse to the longitudinal axis of the stem.

4. A safety system according to claim 1, wherein:
the connector of the mounting is mounted to a pivot bolt, which extends transverse to the longitudinal axis of the stem.

5. A safety system according to claim 1, wherein:
the interface of the connector includes a socket for receiving an end of the support post.

6. A safety system according to claim 1, wherein:
the interface of the connector includes a releasable fastener for releasable fastening of the support post with the connector.

7. A safety system according to claim 1, wherein:
the at least one mechanical fixing comprises a plurality of mechanical fixings disposed on opposed sides of the pivot axis about which the connector pivots relative to the cylindrical stem.

8. A safety system according to claim 1, wherein:
the at least one mechanical fixing is adjustable in terms of its distance relative to the connector in order to enable the connector to be secured at different specific attitude orientations with respect to the cylindrical stem.

9. A safety system according to claim 1, wherein:
the at least one mechanical fixing is an elongate member moveable in its longitudinal direction and arranged to extend inclined upwardly and have an end configured to abut against the connector.

10. A safety system according to claim 1, wherein:
the at least one coupler of the support post includes a collar that is moveably secured to the support post over a range of positions along the length of the support post.

* * * * *